Patented Dec. 11, 1934

1,983,546

UNITED STATES PATENT OFFICE 1,983,546

METHOD OF FUMIGATING SOILS AND COMPOUND FOR USE THEREIN

Maxwell O. Johnson, Wahiawa, Territory of Hawaii, assignor to California Packing Corporation, San Francisco, Calif., a corporation of New York No Drawing. Application October 23, 1929, Serial No. 401,984

9 Claims. (Cl. 167—39)

This invention relates to a method of fumigating soils and is particularly concerned with a method of encouraging root growth and prevent root injuries, wilts, blights and other decay. The invention also relates to a compound for use in fumigating soils, such compound being capable of handling with reasonable safety and of generating a fumigating gas in the soil and in the presence of moisture.

A vast number of organisms, animal and vegetable, live in the soil and exert a great influence on soil productiveness. Some of the organisms are extremely minute, such as fungi and bacteria, whereas others, for example the larger insects, worms and fungi attain a considerable size. Among the organisms injurious to plants may be classed nematodes, root fungi such as nephromyces, fusarium, etc., and insects such as symphylids, varieties of pycnoscelus, etc. It is extremely difficult to control or prevent these various insects and organisms from attacking the roots of young plants and the plants themselves, particularly as the majority of these organisms are extremely resistant to the generally used insecticides such as for example, hydrocyanic acid gas, formalin, Bordeaux mixtures, oil emulsions, etc.

In addition, the known fumigants and insecticides do not affect all insects and fungi, so that repeated treatments with various materials needs be employed. Certain of these insecticides and fumigants are injurious to the plant growth; for example, formalin causes bad burning, Bordeaux mixtures injure the plants, copper borate solutions are both injurious and have no fungicidal value.

An object of this invention is to disclose and provide a method of fumigating soils whereby both insectary and fungidal causes of plant injury may be controlled or eliminated.

An object of this invention is to disclose and provide a method of stimulating root and plant growth, particularly in infested soils.

Another object is to disclose and provide a method of employing nitrated phenols or benzols as soil fumigants.

Another object of this invention is to disclose and provide a method of employing volatile chlorinated nitro-compounds as soil fumigants.

Another object is to disclose and provide a material adapted to be used for soil fumigation.

A still further object is to disclose and provide a material adapted to be introduced into soils and liberate chlorinated nitro-compounds therein.

It has been discovered that volatile chlorinated nitro compounds effectively destroy or inhibit the action of insectary and funigal parasites and cure all root troubles encountered in badly infected soils. By volatile chlorinated nitro compounds, it is desired to include all compounds including the radical $NO_2$, such as for example, picric acid or trinitrophenol, chloropicrin or other nitro derivatives of an aliphatic compound, and similar substances such as dichlor-dinitromethane and tetrachlor - dinitro - ethane. Chlorinated nitro compounds of the lower aliphatic series are particularly desirable because of their volatibility. Non-volatile compounds are undesirable as they are apt to remain in the soil for a sufficient length of time to cause root injuries instead of the beneficial effects observed otherwise.

It has been found that chloropicrin or trichloro-nitromethane is particularly adapted to the treatment of soils, and it may be employed with comparative ease and great efficiency in accordance with the methods described hereinafter. Not only are insects and fungi destroyed or prevented from attacking the plants, but in addition, the growth of plants and roots is greatly stimulated. The stimulated growth is even greater than that obtained by the most carefully controlled application of fertilizing materials. Chloropicrin is normally a liquid boiling at about 112 degrees C. Instead of employing liquid chloropicrin, a substantially dry mixture of picric acid or calcium picrate and bleaching powder or calcium oxychloride (or other source of hypochlorous acid) may be employed. A dry mixture of picric acid and bleaching powder in the presence of moisture liberates chloropicrin in accordance with the following reaction:

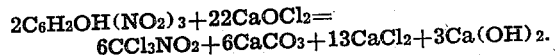
$2C_6H_2OH(NO_2)_3 + 22CaOCl_2 =$
$6CCl_3NO_2 + 6CaCO_3 + 13CaCl_2 + 3Ca(OH)_2.$ As one of the objects of this invention is to prevent root injuries and decay to plantings made in soils infected with injurious nematodes, fungi or insects, it is desirable to introduce the fumigating agent into the soil and to permeate the soil to a considerable depth in order to effectively inhibit the development, growth and existence of the injurious organisms.

In view of the volatile character of chlorinated nitro compounds (such as chloropicrin) which are to be employed, means have been provided for maintaining the fumigant and plant stimulant in the soil for an appreciable time.

In carrying out the invention on Hawaiian pineapple plantations in soils thickly infested with injurious insects and fungi, the soil is covered with paper mulch or long continuous strips of fairly heavy paper (often impregnated or coated with tar or asphalt), the edges of these strips being covered with loose soil so as to maintain the paper in contact with the soil and prevent its removal by the wind. Liquid chloropicrin or an emulsion containing chloropicrin is then preferably injected into the soil at spaced intervals by means of a nozzle inserted through the mulch after the mulch has been laid, or immediately prior to the application of the mulch. Chloropicrin thus injected vaporizes to a certain extent beneath the mulch and permeates the soil to a considerable depth, the vapors passing both upwardly and horizontally through the soil.

The vapors which pass upwardly through the soil are maintained in contact with the soil for a considerable period of time, due to the covering of mulch, thereby destroying all surface insects and fungi.

The penetration of chloropicrin through the soil is remarkable in comparison with results which may have been expected. A heavy soil of the black manganese type which had been well settled by heavy rains and was quite moist and thereby offered maximum resistance to the penetration of any vapors was employed in one test, in which the burrowing cockroach (*Pynoscelus surinamensis*) was used as an indicator. These cockroaches were placed in small bottles, the mouths of which were covered with wire netting. The bottles were buried at different distances from the point of injection, care being taken not to disturb the soil between the mouth of the bottle and the injection hole, so that a true measure of the horizontal penetration of the vapor through the packed soil would be obtained. The injection was made by making a small hole in the soil, one-half inch in diameter and three or four inches deep; a measured amount of chloropicrin was then poured into the hole. Where mulching paper was not used, the injection hole was covered with soil. When paper was used, the injection was made through a perforation in the paper and then the perforation was covered.

A preliminary test showed that chloropicrin under the above conditions killed, overnight, through six inches of soil, but not through a foot. A three day test was run, with the following results:

| Distance in soil from injection hole | Depth of bottle in soil | ¼ oz. chloropicrin injected | | ½ oz. chloropicrin injected | |
|---|---|---|---|---|---|
| | | Without paper | With paper | Without paper | With paper |
| Inches | Inches | | | | |
| 12 | 6 | Alive | Dead | Dead | Dead. |
| 12 | 12 | do | Alive | Alive | Do. |
| 18 | 6 | do | Dead | do | Do. |

These results illustrate that by retaining the total quantity of vapors in the soil by means of a covering of mulch, the total quantity of chloropicrin may be cut substantially in half with substantially the same results. It has been determined that half ounce injections every three feet down the center of the paper mulch and thereneath should give complete fumigation under the paper and these methods show a greatly stimulated growth of plants in the field.

Not only are the nematodes, insectary pests, and fungi destroyed, but root growth is greatly accelerated. The symphylids, a small white insect about ¼ of an inch long, and a small centipede, similar in appearance but brown in color appear to the worst root gnawing insects infesting the pineapple plantations in Hawaii. Root cages with glass sides used in determining the effect of chloropicrin showed that these insects were completely destroyed when the soil was fumigated with chloropicrin. The gall-forming nematode, the tylenchus spiralis nematode, and a root-hair fungus (nephromyces) as well as fusarium fungi and others are substantially completely eliminated. The stimulating action on the beneficial soil bacteria and root growth is remarkable in comparison with plantings in the same but untreated soil.

The remarkable growth stimulation obtained by liberating chloropicrin beneath the surface of the soil is evidenced by the following comparative weights of pineapple plants in soil treated with chloropicrin. In untreated soil, the average air-dry weight of pineapple plants is found to be 361 grams for the shoots and 9.8 grams for the roots. Plantings made in a parallel series of the same soil treated with 2 grams of chloropicrin per cubic foot of soil produced shoots weighing 581 grams and roots weighing 17.3 grams. In other words, the shoots in treated soil showed an increase of 161% whereas the roots showed an increase of 176%. This very remarkable growth appears to be correlated with the ammonia nitrogen content of the soil. The ammonia nitrogen content of untreated soil 14 days after planting was 28 parts per million. Soil treated with 2 grams of chloropicrin showed 77 parts per million, an increase of 282%. 28 days after planting, the untreated soil contained only 17 parts per million of ammonia nitrogen whereas the treated soil contained 69 parts per million. In this connection, attention is called to the fact that during the last two weeks of this period (between the 14 and 28 day periods) a decrease of 40% in ammonia nitrogen content occurred in the untreated soil whereas but a 10% decrease occurred in the treated soil.

Chloropicrin is preferably injected into the soil prior to planting, in liquid state from cylinders made of an anti-corrosive metal such as monel, and the operators should preferably be provided with gas masks. In order to facilitate the fumigation of soils, a dry mixture of picric acid or a salt of picric acid (such as calcium picrate, sodium picrate, etc.), and bleaching powder or other chlorinating agent may be employed, the mixture containing for example ten parts or more, by weight, of bleaching powder to one part, by weight, of dry picric acid. The dry mixture may then be placed into the soil which it is desired to fumigate and covered. The natural moisture of the soil together with rainwater, etc., acting upon the mixture of picric acid and bleaching powder causes the generation of chloropicrin and thereby liberates the fumigant within the soil over a protracted period of time.

It is to be understood that the invention is not limited to the particular examples specifically stated hereinabove, but includes all the modifications and changes which come within the scope of the disclosures made hereinabove and the appended claims.

I claim:

1. A method of stimulating plant growth which consists of injecting liquid chloropicrin into and beneath the surface of the soil, permitting the chloropicrin to vaporize in the soil, and retarding the escape of the chloropicrin vapors from the soil by means of a substantially impervious covering laid upon the surface of the soil substantially above the point of injection whereby the chloropicrin is rendered available as a plant growth stimulant for a protracted period of time.

2. A method of stimulating plant growth which comprises injecting liquid chloropicrin into and beneath the surface of the soil, permitting the chloropicrin to vaporize in the soil, and retarding the escape of chloropicrin vapors from the soil by means of a substantially impervious fibrous covering impregnated with asphalt laid upon the surface of the soil whereby the ammonia nitrogen content of the soil is increased and rendered available as a plant growth stimulant for a protracted period of time.

3. A method of stimulating plant growth which comprises liberating chloropicrin beneath the surface of the soil, and retarding the upward escape of the chloropicrin from the soil by means of a substantially impervious covering laid upon the surface of the soil whereby the ammonia nitrogen content of the soil is increased and rendered available as a plant growth stimulant throughout a zone in the soil adjacent the point of liberation for a protracted period of time.

4. In a method of stimulating plant growth, the step of increasing the ammonia nitrogen content of the soil by liberating chloropicrin beneath the surface of the soil.

5. In a method of stimulating plant growth, the step of increasing the ammonia nitrogen content of the soil by injecting liquid chloropicrin into and beneath the surface of the soil.

6. In a method of stimulating plant growth, the step of injecting a mixture of a salt of picric acid and a bleaching powder into and beneath the surface of the soil.

7. In a method of stimulating plant growth, the step of increasing the ammonia nitrogen content of soils by injecting a mixture of a salt of picric acid and bleaching powder into the soil, and liberating chloropicrin vapors in the soil by the action of moisture on said mixture.

8. In a method of stimulating plant growth and increasing the ammonia nitrogen content of the soil, the step of injecting a substantially dry mixture of a salt of picric acid and a bleaching powder into and beneath the surface of the soil, liberating chloropicrin vapors beneath the surface of the soil by action of moisture on said mixture, and retarding the escape of the chloropicrin vapors from the soil by means of a substantially impervious covering laid upon the surface of the soil whereby the chloropicrin is rendered available as a plant growth stimulant for a protracted period of time.

9. A method of stimulating the growth of pineapple plants, which comprises liberating chloropicrin beneath the surface of the soil and retarding the upward escape of chloropicrin vapors from the soil by means of a substantially impervious covering laid upon the surface of the soil whereby the ammonia nitrogen content of the soil is increased and rendered available as a plant growth stimulant throughout the zone in the soil adjacent the point of liberation for a protracted period of time.

MAXWELL O. JOHNSON.